Patented Apr. 19, 1949

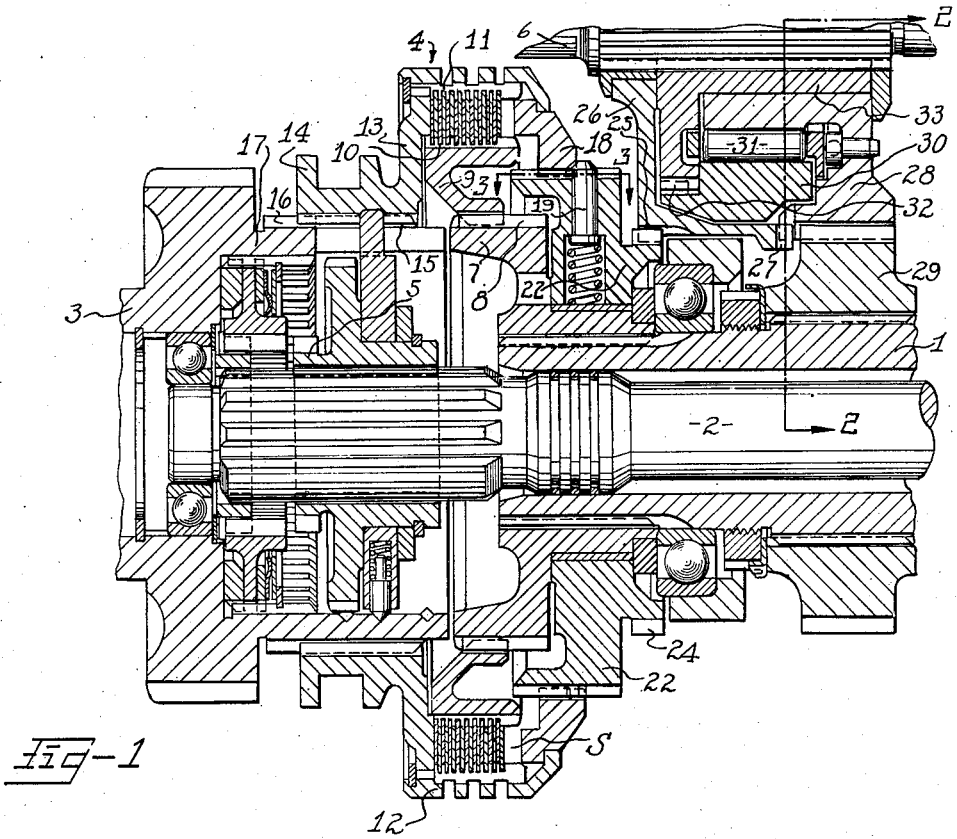
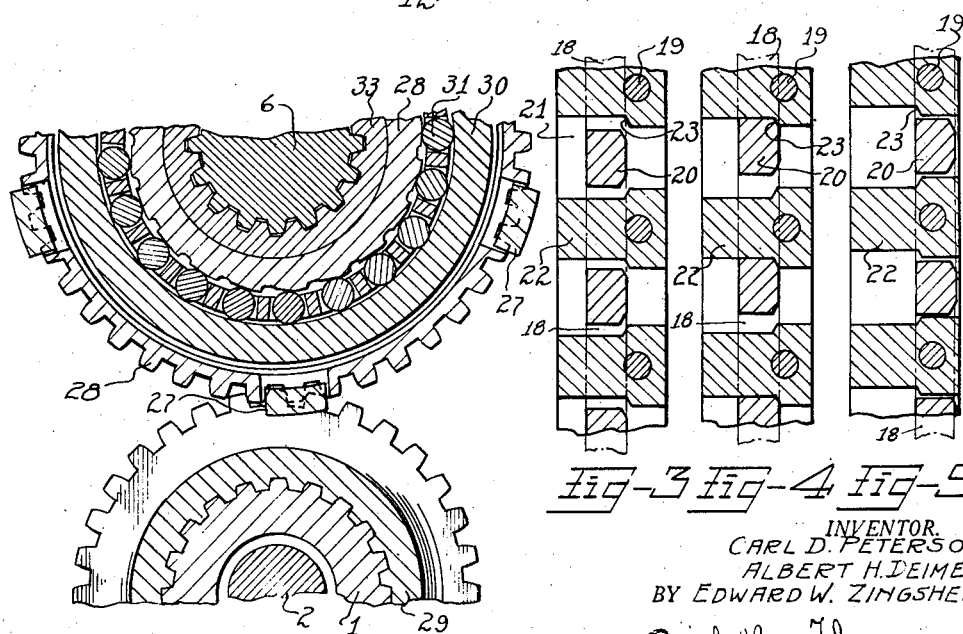

2,467,987

UNITED STATES PATENT OFFICE 2,467,987

SYNCHRONIZING CLUTCH

Carl D. Peterson, Albert H. Deimel, and Edward W. Zingsheim, Toledo, Ohio; Marion F. Peterson, executrix of said Carl D. Peterson, deceased, assignors to Dana Corporation, Toledo, Ohio, a corporation of Virginia Application February 3, 1945, Serial No. 575,952

14 Claims. (Cl. 192—53)

This invention relates to synchronizing clutches, that is, clutches including driving and driven members, each of which includes a toothed section and a friction section for coacting with complemental sections of the other member, the driving and driven members having a relative axial shifting movement into and out of clutching position, the friction sections, which are capable of transmitting torque, engaging preliminarily to the engagement of the toothed sections.

The ordinary synchronizer functions to bring a driven train of gears up or down to a speed synchronized with another driving shaft or train of gears, to be clutched together by the synchronizer. As long as one or the other of the two parts to be coupled is being accelerated or decelerated, work is being done, due to the inertia of the parts being accelerated as well as the bearing friction. The unblocking or unlocking force due to the shifting-in force is applied through the cam angles of the blocking shoulders of the synchronizer but is not sufficient to unlock against the accelerating load, and therefore, the shift remains blocked until the speeds synchronize. When this occurs, the load is reduced to merely the friction load. Under this friction load, the shifting-in force is sufficient to cam or push one of the train of gears or parts to be clutched together still farther ahead beyond synchronization, to cross the speeds, and cause the unblocking of the blocking shoulders out of end to end abutting position. Hence, in the conventional synchronizer, the blocking is controlled by the load. As long as the load is heavy, due to the inertia of parts being accelerated, the shifting-in force is not sufficient to unlock. For unlocking or unblocking to take place, the load must be reduced until the resultant of the shifting-in force against the cam angles of the blocking shoulders is sufficient to cause one set of blocking shoulders to shift circumferentially relative to the other set or the part on which the other set is provided, and thus cause the blocking shoulders to move out of end abutting relation.

The invention therefore has for its object a synchronizer in which the unlocking takes place due to equalization of speeds rather than due to the reduction of the load, or has for its object a synchronizer including means for positively rotating one of the blocking parts, or the element on which one set of blocking shoulders is provided at a slightly different speed or faster than the other blocking parts, so that as far as the blocking shoulders are concerned, synchronization is reached at a slightly lower speed than actual synchronization.

The invention hence has for its object means, which is automatically operated to shift a blocking element out of blocking position, when the speeds are substantially synchronized, so that the complete shifting-in is positively controlled by the synchronized speeds of the parts to be clutched together.

The invention also has for its object a synchronizing clutch construction, wherein the friction sections are capable of quickly picking up the load or transmitting torque to quickly synchronize the speeds and are located within a particularly compact space, the friction sections preferably being a multiple friction disk clutch.

The invention consists in the novel features and in the combinations and constructions hereinafter set forth and claimed.

In describing this invention, reference is had to the accompanying drawings, in which like characters designate corresponding parts in all the views.

Figure 1 is a longitudinal sectional view of a synchronizing clutch embodying this invention, the contiguous portions of the transmission mechanism being also shown.

Figure 2 is a sectional view on line 2—2, Figure 1.

Figure 3 is a sectional view on line 3—3, Figure 1.

Figures 4 and 5 are views similar to Figure 3 showing different positions assumed by the blocking teeth shown in Figure 3 during the shifting-in operation.

The invention resides in a synchronizing clutch operable to clutch two elements, or shafts, together, a set of blocking shoulders on one clutch member, usually on the friction section thereof, a blocker associated with the other clutch member and mounted to rotate relatively thereto and provided with a set of blocking shoulders in end abutting relation to the former set to block shifting-in when the speeds are different, motion transmitting means between the element or shaft on which said other member, that is, the member with which the blocker is associated, is mounted, and the blocker to rotate the blocker at a different speed than said other member, when the speeds are substantially synchronized, and thus move the blocking shoulders out of end abutting relation.

The synchronizing clutch is shown as embodied in the general type of torque converter transmission of Peterson and Deimel Patents 2,397,883, August 2, 1946, and 2,399,568, August 30, 1946, in which the starting torque is transmitted from the converter output shaft to the driven shaft through a countershaft gearing and at high speed through the converter output shaft to the driven shaft through a synchronizing clutch. Incidentally, direct drive independently of the converter and the synchronizing clutch is from a direct drive shaft from the engine to the driven shaft through a direct drive clutch. The synchronizing clutch of this invention may be used in place of the synchronizing clutches of the patents.

As in this embodiment of the invention, the blocker acts in this manner for the most part during the down-shift or shift from direct drive to converter shaft drive and quickly builds up to synchronized speed, the blocker is mounted on the driving member of the clutch and the blocker is positively actuated, as through a train of gears from the drive shaft, from which the drive is to be taken after the shift is completed, that is, in this instance, from the converter shaft, and hence the blocker actuated through the gearing to rotate faster than the clutch member or the toothed section thereof mounted on the converter shaft.

In the drawing, the numeral 1 designates the drive shaft or element, 3 the driven shaft or element axially alined therewith, and 4 the synchronizing clutch to connect and disconnect the drive and driven shafts 1 and 3. The drive shaft 1, in this embodiment of the invention, is the output shaft of the hydraulic torque converter, and is arranged concentric with the direct drive shaft 2 which is connectable to and disconnectable from the driven shaft or element 3 by a clutch 5, as in the patents referred to. 6 designates the shaft of a starting and reverse reduction countershaft gearing between the drive shaft 1 and the driven shaft 3, substantially as shown in Patent No. 2,397,883. The counter-shaft is used, for convenience, in connection with the blocker hereinafter described.

The synchronizing clutch includes driving and driven members having relative axial shifting movement into and out of engaged position, each of the members having a toothed section and a friction section for coacting with the toothed and friction sections of the other member, the friction sections being operable to engage in advance of the engagement of the toothed sections during the shifting-in operation, as in synchronizing clutches generally, and being blocked from complete shifting-in until the speeds of the driving and driven members are synchronized or substantially synchronized, and means for automatically effecting the unblocking operation when the speeds are synchronized. The clutch further includes means by which the friction sections release under a predetermined shifting-in force after being engaged by the shifting-in force, and in releasing, control the unblocking of abutting shoulders which normally prevent engagement of the toothed sections of the synchronizing clutch until the speeds of the shafts 1 and 3 are synchronized.

The driving member of the clutch includes a toothed section 7 splined on the drive shaft 1 and having peripheral splines or clutch teeth 8, and a friction section 9 slidably splined on the teeth 8 of the toothed section 7, and a set of friction disks 10 splined on the periphery of the friction section 9, the section 9 being the inner drum of a multiple disk clutch. The driven member of the clutch comprises an outer drum 12, a second set of disks 11 splined therein and interleaved with the disks 10, a shiftable pressure plate for compressing the disks 10 and 11, and an abutment 18 in the drum 12 against which the pressure plate compresses the disks. The pressure ring is provided with a shifting collar 14 formed with internal splines 15, the ends of which constitute clutch teeth which are shiftable into engagement with the clutch teeth 8 of the toothed clutch section 7, as in Patent No. 2,399,568. Also, as in said patent, the splines 15 of the collar 14 are interlocked with peripheral teeth 16 on a head or drum 17 on the driven shaft 3. The collar 14 of the pressure ring 13 is provided with a groove for receiving the shifting fork of the power shifting mechanism.

The abutment 18, and hence the drum 12, is normally held from shifting axially during compression of the disks by yielding holding means as spring pressed latches or poppets 19, until the disks are compressed under a certain shifting-in force. When the holding force of the poppets is overcome by the shifting-in force, the disks 10, 11, release. The release occurs when the speeds have been synchronized just prior to the engagement of the clutch teeth 15, 8. The total of the spaces between the clutch disks 10, 11, is indicated at S.

The abutment 18 is formed with blocking shoulders 20 movable in slots 21 in a blocking element or blocker 22, the walls of the slots being provided with narrow portions providing complemental blocking shoulders 23 on the blocking element 22 at opposite sides of the slot. The narrow portions are of a width to slidably fit the shoulders 20. The wider portions of the slots permit a limited rocking movement of the abutment to engage and disengage the blocking shoulders. The shoulders are here shown as beveled slightly at the corners providing cam angles.

The blocking element or blocker 22 is shiftable automatically by power controlled by the speeds of the driving and driven members, when the speeds are substantially synchronized, in order to bring the shoulders 20 and 23 out of blocking position, that is, out of the position shown in Figure 4, into position where they can be shifted or into the position shown in Figure 5. As here illustrated, the blocking element 22 is a wheel or clutch gear rotatably mounted on the converter or drive shaft 1 or the hub of the driving member of the clutch which is connected to the shaft 1, through a train of gears to the drive shaft 1, so that the blocker is rotated slightly faster than the drive shaft 1 as the speeds of the shafts 3 and 1 synchronize preliminary to clutching the shaft 3 to the shaft 1. The train of gears includes a gear for convenience mounted on the countershaft 6. The blocking element or blocker has gear teeth 24 meshing with teeth 25 on a gear 26 rotatable about the countershaft 6, the gear 26 being driven by interlocking lugs or tongues and notches at 27 on the gear 26 and the driving section 28 of an overrunning clutch, which driving section is provided with gear teeth meshing with a gear 29 splined on the converter shaft 1. The gear ratio between 29 and 28 is such that the blocking element or blocker 22 is rotated a trifle faster than the converter shaft 1. The countershaft 6 is driven from the converter shaft 1 through the overrunning clutch to permit overrunning when the drive is through a higher gear ratio than low gear ratio. This feature forms no part of the invention and is generally the same as in the patents referred to. The overrunning clutch, in addition to the driving member 28, includes the driven member or inner race 30 with the rollers 31 between two raceways. The raceway 30 is interlocked by means of splines at 32 with a hub 33 splined on the countershaft 6. Assume that a shift is to be made from direct drive to converter drive through drive shaft 1. The collar 14 is shifted to the right, Figure 1, to first unclutch the direct drive clutch 5 and thereby disconnecting the shafts 2, 3, and then to clutch the shafts 1, 3, together through the clutch 4. When the speed synchronizes through the disks 10, 11, of the clutch 4 preliminary to the engagement of the teeth 15, 8, of the clutch 4, the blocker 22 is rotated slightly faster than the shaft 1 to shift the blocking shoulders 20, 23, out of blocking position from the position shown in Figure 4 to that shown in Figure 3, the blocker 22 being shifted from the gear 29 on the shaft 1 to the gear teeth on the outer race 28, to the interlocking tongues and notches at 27, Figure 1, to gear 26 and thence to the gear teeth 24. During the action, the shaft 1 is overrunning the countershaft 6, as in the transmissions of the patents referred to. With the shoulders 22, 23 out of abutting or alined position, the shifting-in force overcomes the holding or latching action of the poppets 19 so that the disks 10, 11, release.

The spring-pressed poppets 19 are mounted in radial bores in the blocker 22 and are pressed outwardly slightly beyond the periphery of the splines on the blocker 22 into position to block axial shifting of the drum 12 and abutment 18 in the same direction as the shifting-in force, the ends of the poppets being beveled or cam shaped and coacting with complemental surfaces on the abutment 18. When the shifting-in is initiated, the friction disks 10 and 11 are compressed and frictionally engage each other, thus clutching the converter shaft 1 and the driven shaft 3 together through the friction clutch. The friction clutch quickly synchronizes the speeds, particularly owing to the relatively great friction surfaces of the disks. Complete shifting-in can not be effected, however, as the blocking shoulders 20 and 23 are in the position shown in Figure 4. However, the blocker 22 being rotated faster than the shaft 1 or the engaged clutch, as the speeds are now synchronized, actuates the blocker to move the shoulder 23 away from the shoulder 20 into the position shown in Figure 3, so that now under continued shifting-in force, the clutch teeth 15 move into interlocking engagement with the clutch teeth 8 and the shoulders 20 pass into the position shown in Figure 5. When the friction sections are released, the drum 12 and its abutment 18 rotates with the blocker 22.

If the shift is being made from neutral into converter drive, the vehicle is at rest, and the blocking effect of the shoulders 20 and 23 or resistance to the cam action of the shoulders 20, 23 is reduced to a point where the beveled or cam angles of the shoulders are sufficient to cam the shoulders 20 and 23 from the relative position shown in Figure 4 to that shown in Figure 3, so that shifting-in may be completed. When a shift is being made into converter drive from low gear drive through the countershaft or is being made from the position shown in Figure 1, with the vehicle moving in low speed range through the countershaft 6, the speed of the drum 12 is much slower than that of the clutch gear 7. In making this shift, the engine is decelerated, the same as in making any up shift. Hence, during this shift, the speed of the drum 12 will remain substantially constant, while the speed of the clutch gear 7 will be reduced during the deceleration of the engine, until their speeds cross, permitting the shift to be completed.

In operation, the driven shaft 3 is actuated in low gear from the converter or drive shaft 1 through the countershaft 6 and countershaft gears, or may be driven directly through the synchronizing clutch 4 by shifting the clutch 4 into engaged position, as in the patents referred to. In shifting however down from direct drive between the shafts 2 and 3, the clutch collar 14 is shifted to the right first to neutral position and then further to the right to engage the synchronizing clutch 4. During the shifting in of the synchronizing clutch 4, the pressure plate 13 compresses the disks 10 and 11 toward the abutment 18, this causing the clutch gear 7 to rotate with the section 9 of the clutch 4. As the disks 10 and 11 are being compressed, the blocking shoulders 20, 23, assume the position shown in Figure 4. When the speeds of the clutch gear 7 and drum 12 are substantially synchronized through the disks 10 and 11, the cam angles on the blocking shoulders 20 and 23 are not sufficient to complete the shift until the blocker 22 rotates faster than the gear 7 through the gears 29, 28, 26, and gear teeth 24 on the blocker. This faster rotation causes the blocking shoulders 23 on the blocker to move away from the blocking shoulders 20 on the abutment 18 so that the shift may be completed from the position shown in Figure 3 to that shown in Figure 5. The faster rotation of the blocker takes place only after the drive shaft 1 has been built up to full speed. Before it is up to full speed, the blocking shoulders 20 and 23 remain in the position shown in Figure 4. The drive shaft 1 is built up to full speed through the friction disks 10 and 11, and when the blocking shoulders 20, 23, are out of alinement or abutting relation (Figure 3), the shifting-in force overcomes the latches or poppets 19 and causes the abutment 18 to depress the poppets 19 and release the disks 10, 11.

What we claim is:

1. In a synchronizing clutch, driving and driven members, each of said members including toothed and friction sections for coacting with complemental toothed and friction sections of the other member, the friction sections being operable to engage preliminarily to the engagement of the toothed sections during the clutching-in operation, one of the members being shiftable axially to engage and disengage the clutch, and one friction section being yieldingly releasable axially relative to the shifting-in force to release the friction sections, yielding means for normally holding the releasable friction section from axial yielding movement during the shifting-in operation under a predetermined shifting-in force, and yielding out of holding position, when overcome by the shifting-in force, said yielding friction section having a set of blocking shoulders, a rotatably mounted blocker having a set of shoulders coacting with the former blocking shoulders normally blocking axial shifting when the speeds are differential, and means tending to rotate the blocker independently of the driving and driven members to move the blocking shoulders of the yielding friction section and the blocker out of blocking position, as the speeds of the driving and driven members synchronize.

2. In a synchronizing clutch, driving and driven members, each of said members including toothed and friction sections for coacting with complemental toothed and friction sections of the other member, the friction sections being operable to engage preliminarily to the engagement of the toothed sections during the clutching-in operation, one of the members being shiftable axially to engage and disengage the clutch, and one friction section being yieldingly releasable axially relative to the shifting-in force to release the friction sections, yielding means for normally holding the releasable friction section from axial yielding movement during the shifting-in operation under a predetermined shifting-in force, and yielding out of holding position when overcome by the shifting-in force, said yielding friction section having a set of blocking shoulders, a rotatably mounted blocker having a set of shoulders coacting with the former blocking shoulders normally blocking axial shifting when the speeds are differential, and motion transmitting means between the element on which the other of said members is mounted and the blocker and tending to rotate the blocker relative to said other member, in combination with driving and driven elements on which said members are mounted respectively.

3. In a synchronizing clutch, driving and driven members, each of said members including toothed and friction sections for coacting with the complemental toothed and friction sections of the other member, the friction sections being operable to engage in advance of the toothed sections during the clutching-in operation, said friction sections including interleaved friction disks, one of said members being shiftable axially relatively to the other to compress the disks and move one toothed section into clutching engagement with the other toothed section and including a pressure plate to compress the disks and the friction section of the other member including an axially shiftable abutment for the disks, a yielding latching part coacting with the abutment to normally hold the abutment from axial shifting when the disks are being compressed under the shifting-in force, said yielding latching part adapted to release the abutment when the shifting-in force reaches a predetermined amount, means carrying the latching part, and connections between one of the members and the carrying means to cause said carrying means and the abutment to normally rotate with one of said members.

4. In a synchronizing clutch, driving and driven members, each of said members including toothed and friction sections for coacting with the complemental toothed and friction sections of the other member, the friction sections being operable to engage in advance of the toothed sections during the clutching-in operation, said friction disks including interleaved friction disks, one of said members being shiftable axially relatively to the other to compress the disks and move one toothed section into clutching engagement with the other toothed section and including a pressure plate to compress the disks and the friction section of the other member including an axially shiftable abutment for the disks, the abutment being formed with a set of blocking shoulders, a blocker rotatable relatively to the other member and having a set of blocking shoulders for coacting with the former blocking shoulders, yielding means between the blocker and the abutment to normally hold the abutment from axial shifting when the disks are being compressed under the shifting-in force and yielding to release the abutment and the disks when the shifting-in force reaches a predetermined amount, and means for rotating the blocker to move its blocking shoulders out of engagement with the shoulders of the abutment.

5. In a synchronizing clutch, driving and driven members mounted on drive and driven shafts, each of said members including toothed and friction sections for coacting with the complemental toothed and friction sections of the other member, the friction sections being operable to engage in advance of the toothed sections during the clutching-in operation, said friction sections including sets of interleaved friction disks, one of said members being shiftable axially relatively to the other to compress the disks and move one toothed section into clutching engagement with the other toothed section and including a pressure plate to compress the disks and the friction section of the other member including an axially shiftable abutment for the disks, the abutment being formed with a set of blocking shoulders, a blocker rotatable relatively to the other member and having a set of blocking shoulders for coacting with the former blocking shoulders, yielding means between the blocker and the abutment to normally hold the abutment from axial shifting when the disks are being compressed under the shifting-in force and yielding to release the abutment and the disks when the shifting-in force reaches a predetermined amount, and motion transmitting means between the shaft, on which the said other member is mounted, and the blocker and tending to rotate the blocker relatively to said other member, in combination with driving and driven elements on which the driving and driven clutch members are mounted.

6. In a synchronizing clutch, driving and driven members, each of said members including toothed and friction sections for coacting with complemental toothed and friction sections of the other member, the friction sections being operable to engage in advance of the toothed sections to effect synchronization, one friction section being axially displaceable relative to the other, and releasable means for holding one friction section from axial displacement while the other friction section is being operated to engage the friction sections, said releasable means being operable to release the friction sections upon application of a predetermined shifting-in force, and means for shifting one of said members into and out of engaged position.

7. In a synchronizing clutch, driving and driven members, each of said members including toothed and friction sections for coacting with complemental toothed and friction sections of the other member, the friction sections being operable to engage in advance of the toothed sections to effect synchronization, axially releasable means for holding one friction section from axial displacement while the other friction section is being operated to engage the clutch, said releasable means being operable to release the friction sections upon application of a predetermined shifting-in force, the releasable means including spring-pressed poppets to hold it from axial shifting movement during the axial shifting-in movement of the other friction section, and means for shifting one of said members into and out of engaged position.

8. In a synchronizing clutch, driving and driven members, each of said members including toothed and friction sections for coacting with complemental toothed and friction sections of the other member, the friction sections being operable to engage in advance of the toothed sections, a blocker adjacent one of the members and rotatable relatively thereto, one of the friction sections being mounted on the blocker to have a rocking movement, within limits, relatively thereto, and also to shift axially relative to the blocker, spring-pressed poppets carried by the blocker and coacting with the friction section mounted thereon to normally hold it from axial movement during the shifting-in of the other friction section, the poppets coacting with the coacting friction section with a cam action, whereby the poppets release the friction section and permit said section coacting with the blocker to shift axially and release the friction sections, the blocker and coacting friction section having coacting blocking shoulders, means for rotating the blocker at a different speed from that of the adjacent clutch member, and means for effecting relative axial shifting of the clutch members to engage and disengage the clutch.

9. In a synchronizing clutch, driving and driven members, each of said members including toothed and friction sections for coacting with complemental toothed and friction sections of the other member, the friction sections being operable to engage in advance of the toothed sections, a blocker adjacent one of the members and rotatable relatively thereto, one of the friction sections being mounted to have a rocking movement, within limits, relative to the blocker, and also to shift axially relative to the blocker, the blocker and the last-mentioned friction section having normally engaged blocking shoulders preventing axial shifting of the friction section relative to the blocker, motion transmitting means between one of the members to be clutched together and the blocker for rotating the blocker at a different speed from that of the friction section having the blocking shoulder to move the blocking shoulders of the blocker out of blocking relation to the shoulders on the friction section and permit axial shifting of the friction section relative to the blocker, and thereby release the friction clutch sections, and means for effecting relative axial shifting of the clutch members to engage and disengage the clutch.

10. In a synchronizing clutch, driving and driven members mountable on driving and driven elements to be clutched together, each of said members including toothed and friction sections for coacting with complemental toothed and friction sections of the other member, the friction sections being operable to engage in advance of the toothed sections, a blocker rotatable relatively to the driving member, the friction section of the driven member having an abutment mounted on the blocker to have a relative rocking movement, within limits, relatively thereto, and also an axial shifting movement relative to the blocker, the blocker and the abutment having coacting normally engaged blocking shoulders for holding the abutment from axial shifting, motion transmitting means between the driving element of the parts to be clutched together and the blocker for rotating the blocker at a greater speed than that of the driving clutch member, and means for shifting the driven member axially to engage and disengage the clutch.

11. In a synchronizing clutch, driving and driven members mountable on driving and driven elements to be clutched together, each of said members including toothed and friction sections for coacting with complemental toothed and friction sections of the other member, the friction sections being operable to engage in advance of the toothed sections, a blocker adjacent one of the members and rotatable relatively thereto, one of the friction sections being connected to the blocker to have a rocking movement, within limits, relatively thereto, and also an axial shifting movement relative to the blocker, the blocker and the friction section thereon having normally engaged blocking shoulders normally preventing axial shifting of the friction section connected to the blocker, and motion transmitting means between one of the members to be clutched together and the blocker for rotating the blocker at a different speed from that of the adjacent clutch member.

12. The combination with driving and driven elements of a synchronizing clutch including members rotatably mounted respectively with said elements and having a relative axial shifting in and out movement, each member comprising a friction section and a toothed section, the friction sections engaging during the shifting-in prior to toothed engagement, one of said members having a set of blocking shoulders, a blocker rotatable relatively to said members and having a complemental set of blocking shoulders in end abutting relation with the former shoulders, when the speeds are different, motion transmitting means between one of said elements and the blocker to rotate the same relatively to said member and carry the shoulders of the blocker out of end abutting relation with the other shoulders, when the speeds of the driving and driven elements are substantially synchronized through the friction sections.

13. The combination with driving and driven shafts of a synchronizing clutch including members rotatable respectively with said shafts and having a relative axial shifting in and out movement, each member comprising a friction section and a toothed section, the friction sections engaging during the shifting-in preliminary to the engagement of the toothed section, the friction section of one member having a set of blocking shoulders, a blocker associated with the other member, rotatable relatively thereto, and having a set of blocking shoulders arranged in end abutting relation to the former blocking shoulders, when the speeds of the driving and driven members are different, motion transmitting means between one of said shafts and the blocker to positively rotate the blocker at a different speed than that of the clutch member mounted on said shaft, to shift the blocking shoulders of the blocker out of end abutting relation with the other set of shoulders.

14. In a synchronizing clutch, driving and driven members on driving and driven shafts, said members having relative axial shifting movement into and out of engaged position, each having a toothed section and a friction section for coacting with the toothed and friction section of the other member, the friction sections being operable to engage in advance of the engagement of the toothed sections during the shifting-in operation and one of said members having means which block complete shifting-in movement until the speeds of said members are substantially synchronized and crossed, one of the friction sections including an axially movable abutment, and a spring-pressed latching part normally holding the abutment from movement under the shifting-in force, said latching part being releasable under a predetermined shifting-in force, thereby releasing the friction sections from frictional engagement, said blocking means including a rotatable blocker on said one of the members normally positively blocking axial shifting of the abutment, the abutment and the latching part being carried by the blocker and the blocker having a limited circumferential rocking movement relative to the abutment, and motion transmitting means between one of the shafts and the blocker to rotate it out of blocking position relative to the abutment when the speeds of the driving and driven members cross, thereby permitting shifting in of the toothed sections and the latching part to unlatch under the shifting-in force.

CARL D. PETERSON.
ALBERT H. DEIMEL.
EDWARD W. ZINGSHEIM.

REFERENCES CITED

The following references are of record in the file of this patent:

UNITED STATES PATENTS

| Number | Name | Date |
| --- | --- | --- |
| 1,681,714 | Tullar | Aug. 21, 1928 |
| 2,150,468 | Thomson | Mar. 14, 1939 |
| 2,152,552 | Lindstrom | Mar. 28, 1939 |

FOREIGN PATENTS

| Number | Country | Date |
| --- | --- | --- |
| 380,758 | Great Britain | Sept. 22, 1932 |